United States Patent [19]
Li et al.

[11] Patent Number: 5,520,268
[45] Date of Patent: May 28, 1996

[54] FRICTION TYPE RESISTANCE BOOSTER CHAIN

[76] Inventors: Wenhua Li, 202#, No. 339 Jiefang Ave., Wuhan, 430033, China; Wenchuan Li, Senju Metal Industry Co., Ltd, 1 Matsyama, Moka, Tochigi 321-43, Japan

[21] Appl. No.: 172,635

[22] Filed: Dec. 22, 1993

[30] Foreign Application Priority Data

Dec. 28, 1992 [CN] China ................... 92115069.5

[51] Int. Cl.⁶ .................................. F16D 11/06
[52] U.S. Cl. ............................. 188/82.8; 192/72
[58] Field of Search ................... 188/271, 279, 188/281, 82.1, 82.8; 267/134, 205, 207; 192/72

[56] References Cited

U.S. PATENT DOCUMENTS 1,076,030  10/1913  Ford ........................... 192/72

FOREIGN PATENT DOCUMENTS 88935    4/1921   Switzerland ............... 192/72
1352111  11/1987  U.S.S.R. ................... 188/82.8
289211   4/1928   United Kingdom ........ 192/72

*Primary Examiner*—Robert J. Oberleitner
*Assistant Examiner*—Peter M. Poon
*Attorney, Agent, or Firm*—Merchant, Gould, Smith, Edell, Welter & Schmidt

[57] ABSTRACT

A friction type resistance booster chain includes a locating structure and a set of chain pieces arranged staggeringly into an upper and a lower row and fitted in the locating structure. Each of two adjacent chain pieces has a force receiving surface being opposite in direction and being able to contact the locating structure. Each of two adjacent chain pieces has a contacting surface therebetween. The contacting surfaces of the adjacent chain pieces contact successively so that the chain pieces can be joined into one integer by means of a corrugated leaf spring or chain plates. The friction type resistance booster chain can be used in numerous fields of clutch, overdrive clutch, brake, speed changer, speed differentiator, tight coupler, overload protector, damper, etc. The friction type resistance booster chain is of simple structure, convenient manufacture, reliable operation, low cost, and it is a brand new elemental component for various machineries.

11 Claims, 12 Drawing Sheets

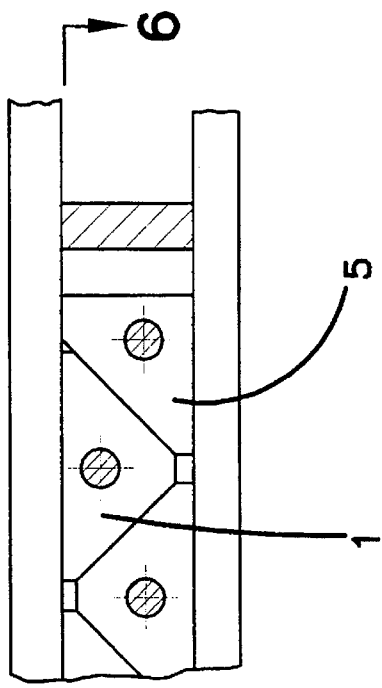
FIG. 5
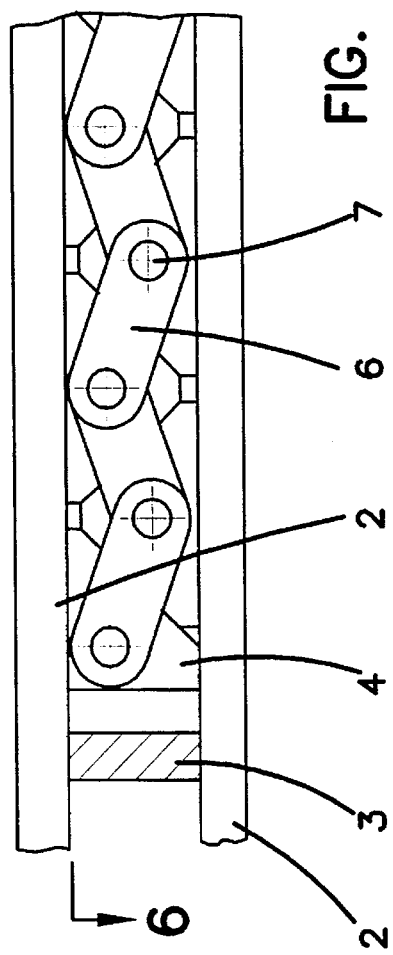
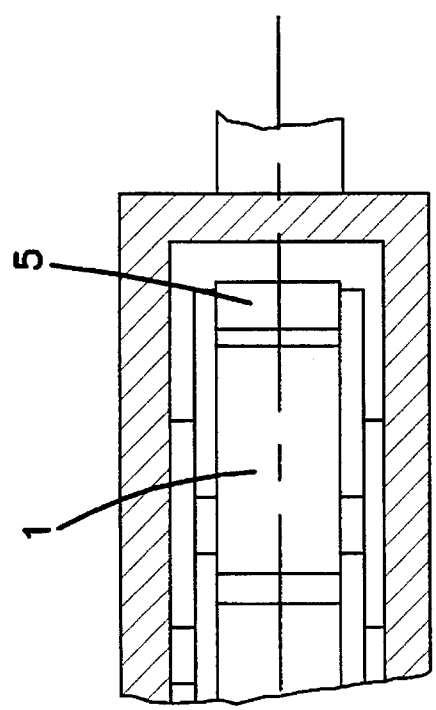
FIG. 6
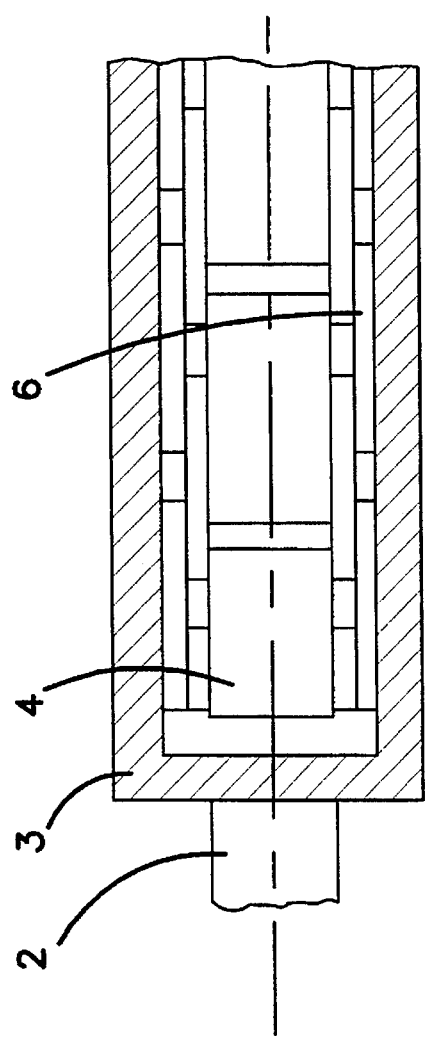

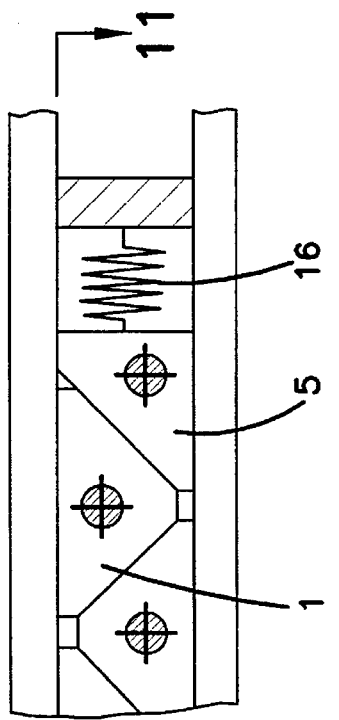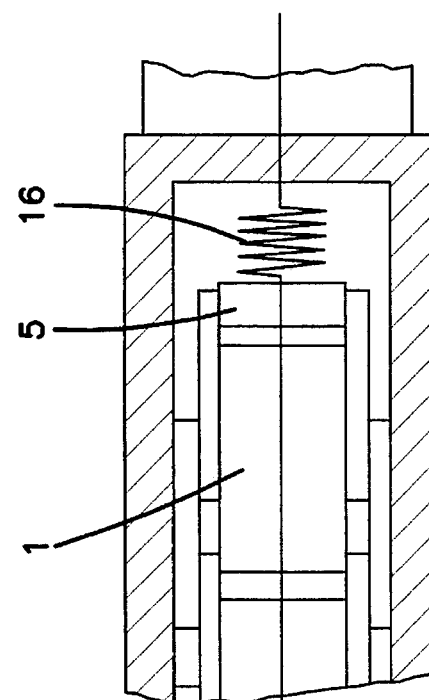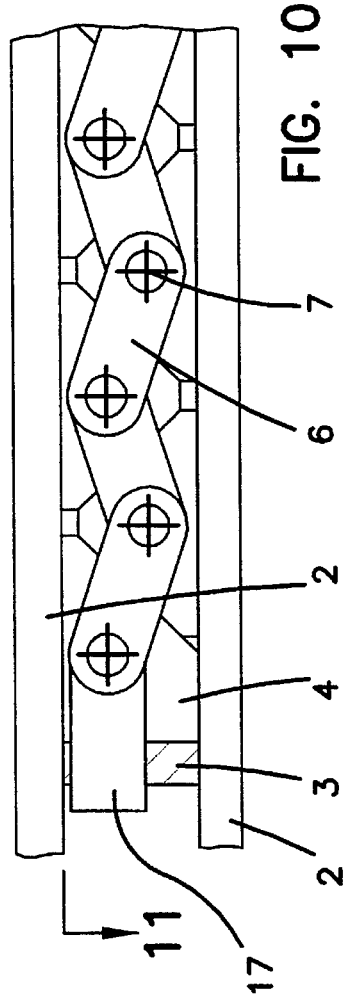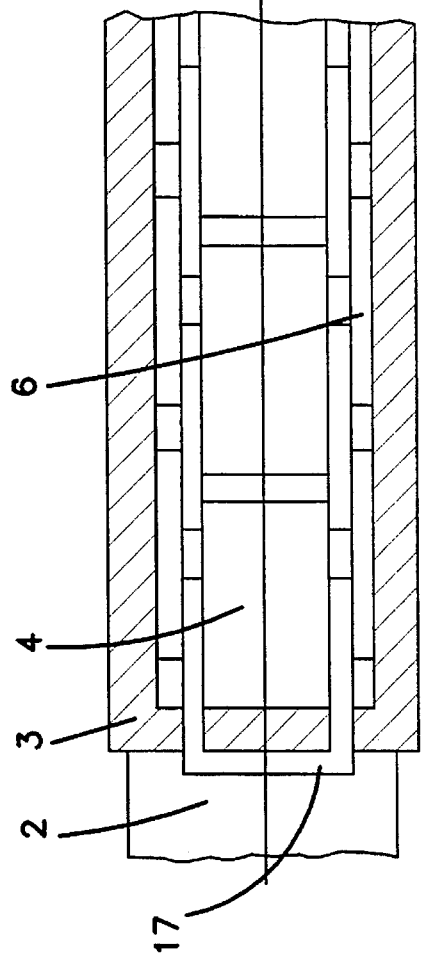
FIG. 10
FIG. 11

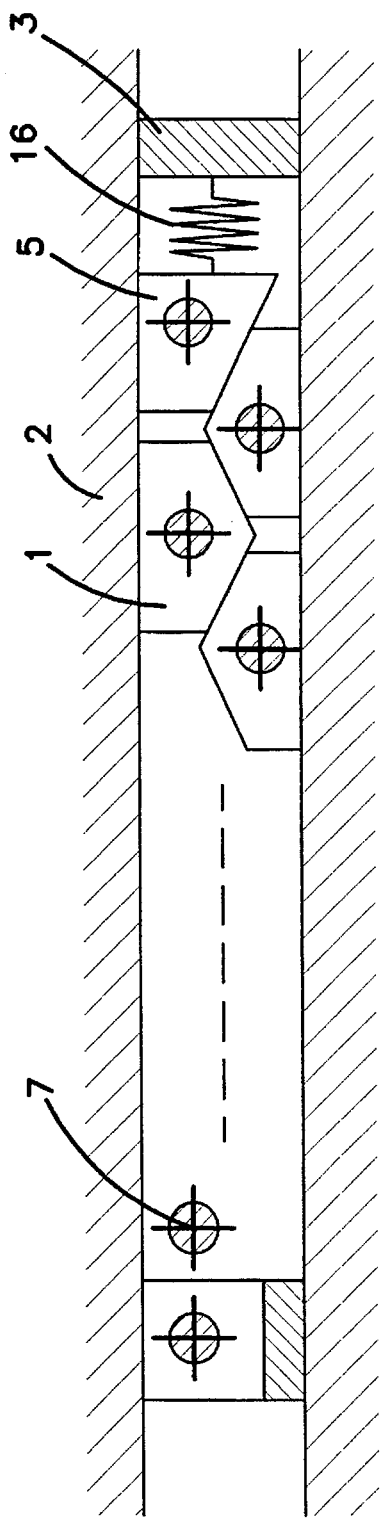
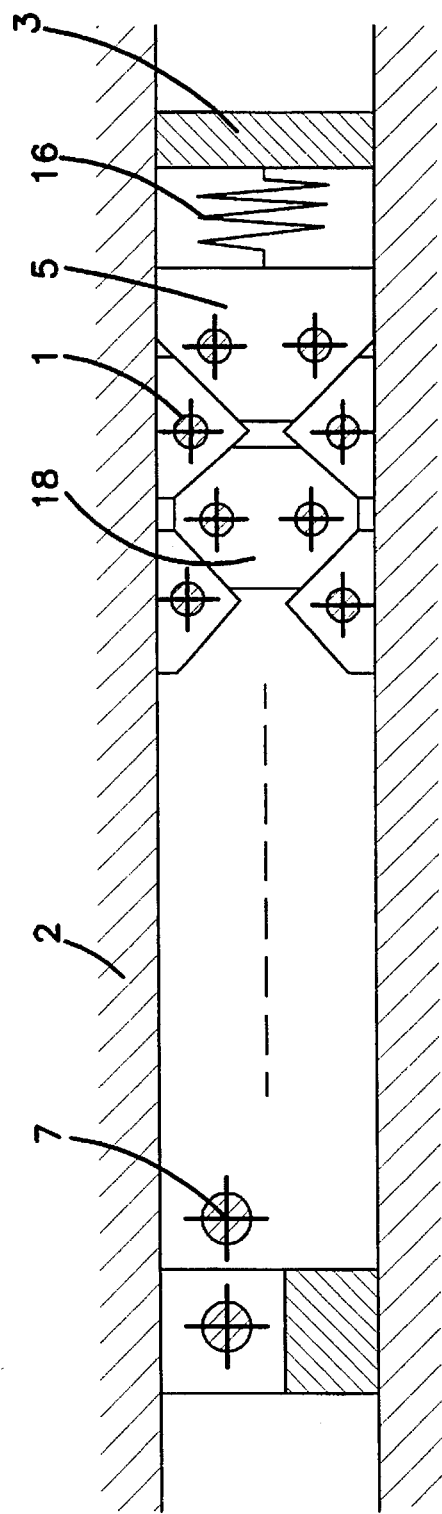
FIG. 12
FIG. 13

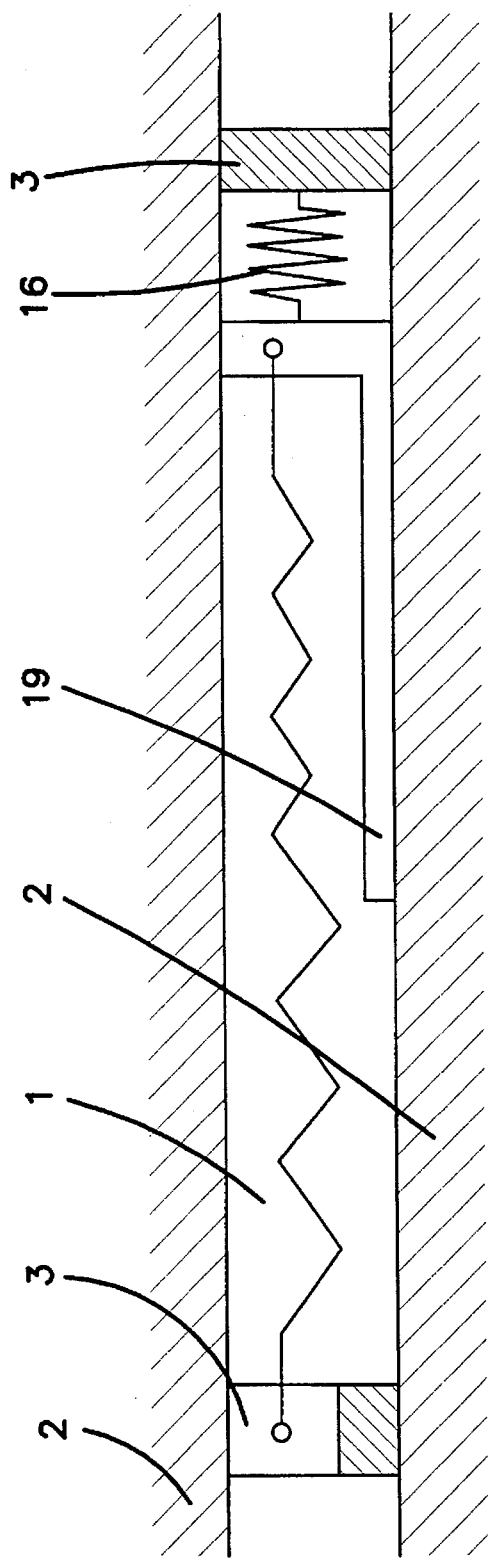
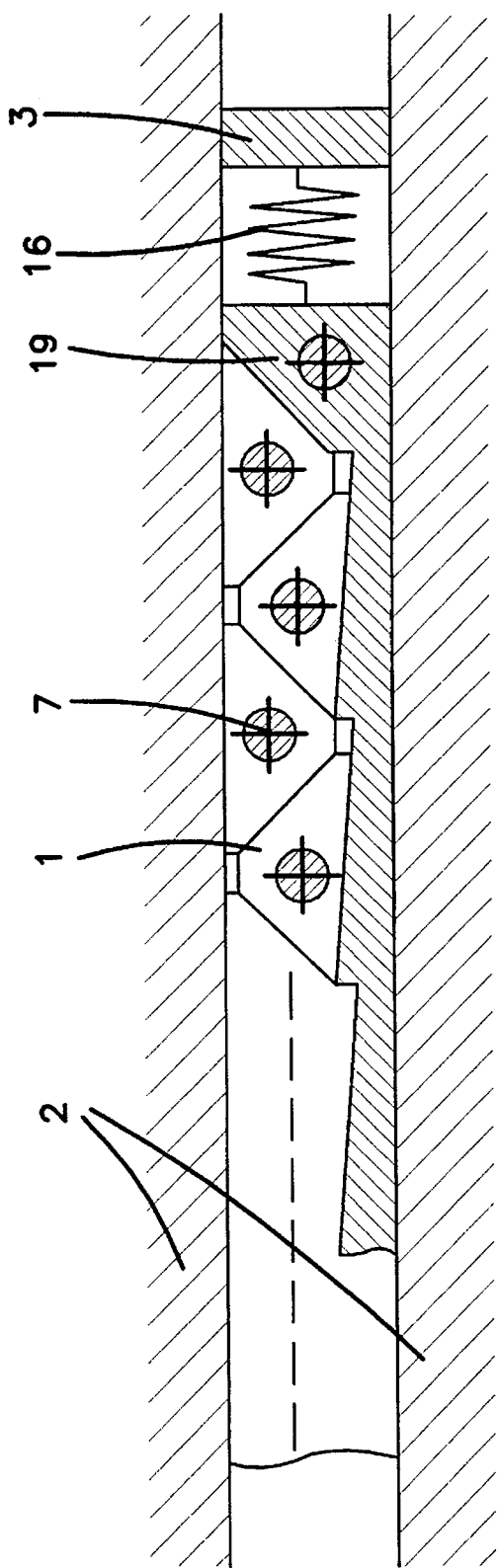
FIG. 14
FIG. 15

FRICTION TYPE RESISTANCE BOOSTER CHAIN

BACKGROUND OF THE INVENTION

The present invention relates to an elemental component in mechanical structure, particularly to a friction type resistance booster chain. The resistance booster chain provided by the present invention is suitable for use in numerous fields of overdrive clutch, clutch, brake, speed changer, speed differentiator, tight coupler, overload protector and damper, etc.

The prior art of the above-mentioned numerous fields has been used continuously for a long time already and there exist shortcomings in various degrees. For instance, the over drive clutch which is used, mainly to conduct speed change, rotation reversing check and intermittent running has two types: One is an engaging type for transferring torque utilizing coupled elements as ratchet and pawl, inlaid jaw, etc; the other is a friction type for transferring torque utilizing friction produced by roller, wedge (eccentric roller), twisted spring, etc, pressing on other element. Therein the engaging type overdrive clutch, in spite of being simpler in structure and rather easy to manufacture, is large in external dimensions, limited in coupling position and noisy and is, therefore, only suitable for use in occasions of less rotation speed difference. And the friction type overdrive clutch, in spite of being compact in volume, able to transfer large torque, smooth in coupling, noiseless in operation, able to couple under high rotation speed difference, is, however, complicated in structure, of higher manufacturing requirement, rather difficult in processing, and is, hence, of higher production cost. There are similar shortcomings existing in other fields of the above-mentioned numerous fields.

The object of the present invention is to provide a friction type resistance booster chain which is of simple structure, convenient manufacture, reliable operation low cost and is a brand new elemental component for use in mechanical structure. By attaching some additional components to its basic structure, it will possess clutching, overdrive clutching, braking, speed change, speed differentiating, tight coupling, overload protecting, damping and various other functions.

SUMMARY OF THE INVENTION

The object of the present invention is realized by a friction type resistance booster chain which consists of a locating structure and a set of chain pieces arranged staggeringly into an upper and a lower row fitted in said locating structure, therein every adjacent chain piece has a force receiving surface opposite in direction and able to contact the locating structure, and there is each a contacting surface between adjacent chain pieces able to contact successively.

The other improvement of the present invention is that said chain piece includes columnar bodies of various cross-sections, quasi-columnar bodies and spherical bodies, said columnar bodies of various sections are of cross-sections of triangle, quadrangle, polygon, circle, segment, ellipse or the combination of various shapes; said quasi-columnar bodies refer to polygonal bodies with identical or approximate top, bottom surface and cross-sectional shapes and with slight different sizes thereof.

The other improvements of the present invention are that the chain pieces can be joined successively and the joiner can be corrugated leaf spring inserted successively in the chain pieces with groove, whose inner curved surface at the bend is in match with the circular arc surface protruding toward the force receiving surface; the joiner can be also a set of chain plates which join the adjacent chain pieces in succession respectively by means of pin on every chain piece and is able to move relatively. In addition, one end of the chain piece set can be joined with the locating structure through one end of a chain plate or the corrugated leaf spring, and the other end is joined with the locating structure by means of a compression spring.

The advantages of the present invention are that this friction type resistance booster chain is of simple structure, reliable operation, convenient manufacture, low cost and it provides a brand new elemental component for various machineries. It can be widely used in various mechanical fields of clutching, overdrive clutching, braking, speed change, overload protecting, tight coupling, speed differentiating, etc.

BRIEF DESCRIPTION OF THE DRAWINGS

Now a description in detail will be made with reference to the accompanying drawings in which:

FIG. 5 is a structural diagram of the second embodiment of the present invention;

FIG. 6 is a sectional view along the line "6—6" in FIG. 5;

FIG. 10 is a basic structural diagram of the seventh embodiment of the present invention;

FIG. 11 is a sectional view along the line "11—11" in FIG. 10;

FIG. 12 is a basic structural diagram of the eighth embodiment of the present invention;

FIG. 13 is a basic structural diagram of the ninth embodiment of the present invention;

FIG. 14 is a basic structural diagram of the tenth embodiment of the present invention;

FIG. 15 is a basic structural diagram of the eleventh embodiment of the present invention;

In all accompanying drawings the same structures or components are denoted by the same reference numerals.

DETAILED DESCRIPTION OF THE PREFERRED EMBODIMENTS

Figure 1:
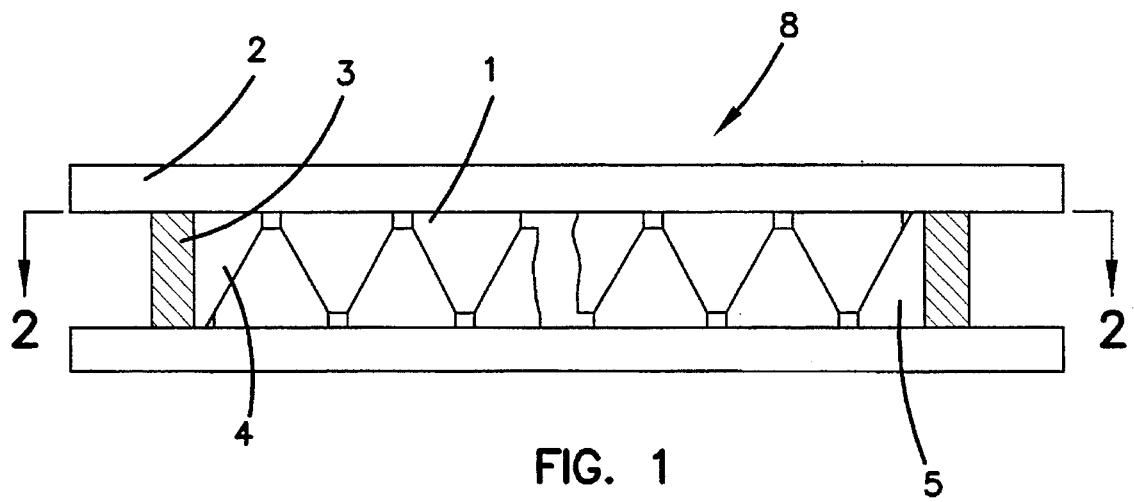
FIG. 1 is a basic structural diagram of the first embodiment of the present invention.
Figure 2:
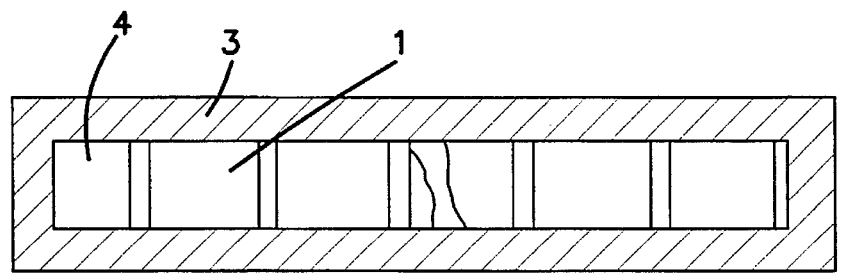
FIG. 2 is a sectional view along the line "2—2" in FIG. 1.
Figure 3:
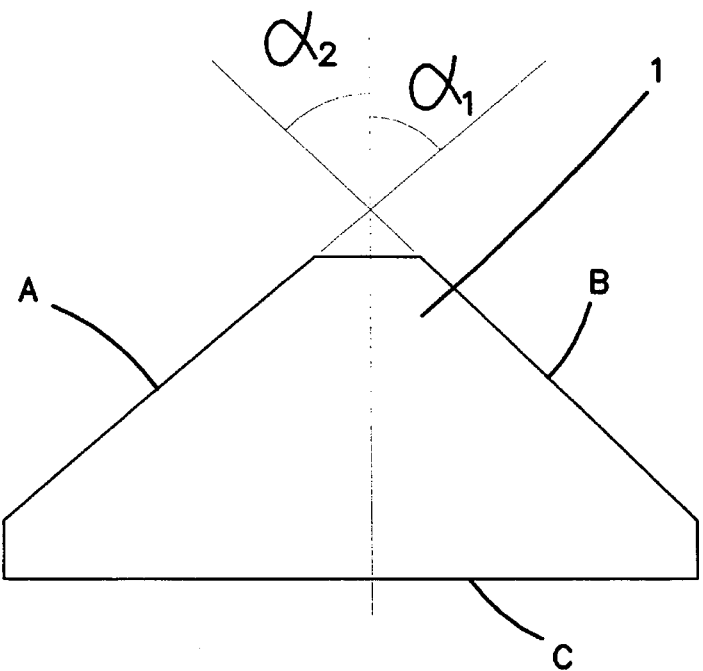
FIG. 3 is a structural diagram of a triangular chain piece.

Referring to FIG. 1 and FIG. 2, they are the basic structural diagrams of the first embodiment provided by the present invention. Here the chain pieces are triangles 1. Several triangles 1 (or called chain piece set) are arranged staggeringly into an upper and a lower row fitted in a locating structure composed of a fixed body 2 and a moving body 3, thereby to prevent triangles 1 from up and down, forward and backward, leftward and rightward free movement. The triangles 1 here are actually columnar bodies in triangular cross-section. The cross-section of the two triangles 4 and 5 at both ends are one half of the middle triangles. Every triangle 1 has a force receiving surface C (See FIG. 3) in contact with the locating structure, while the force receiving surface C of the adjacent triangle is opposite in direction; in addition, between adjacent triangles 1 there is still for each a contacting surface capable of contacting successively, and on both sides of the middle triangles there are other adjacent triangles, thus there are contacting surfaces A and B on both sides of every triangle (See FIG. 3), but the two triangles 4 and 5 at the two ends have only one triangle adjacent to their one side and thus only one contacting surface. The triangles of such a structure and such an arrangement will compose a simplest friction type resistance booster chain (called booster chain for short).

The working principle of the booster chain is such: Since the triangles proper have a certain mass, every triangle, when one end of the booster chain is under a pressure (through the moving body 3), will produce an acceleration, thereby to produce an inertia opposite in direction with the pressure and to produce pressure between the triangles. Since the contacting surfaces between triangles are oblique or slant surfaces, therefore a component force will be produced toward the fixed body 2, thereby to make the two adjacent triangles move along the contacting surface in mutually opposite direction. However, since the upper and lower distance of the locating structure (referring to the fixed body 2) is constant, therefore the movement in the opposite direction between triangle pieces is very limited. This will make the force receiving surfaces of every triangle press tightly the locating structure respectively from the up and down directions, and the friction increases with increased positive pressure and acceleration; the accumulation of these inertias and frictions will constitute the resistance to the movement of the booster chain. And the more the triangle is near to the force receiving end, the larger will be the positive pressure exerted on its force receiving surface, and the larger will be the friction with the fixed body 2. Along with the increase in number of triangles n, the resistance of the booster chain will also increase. Only when these resistances are overcome can the moving body 3 bring the triangles 1 to move. Hence by selecting a proper number of triangles according to damping force required, the present damping effect can be achieved. Such a structure can achieve an effect in dual direction and thus will constitute the simplest damper 8.

Figure 4:
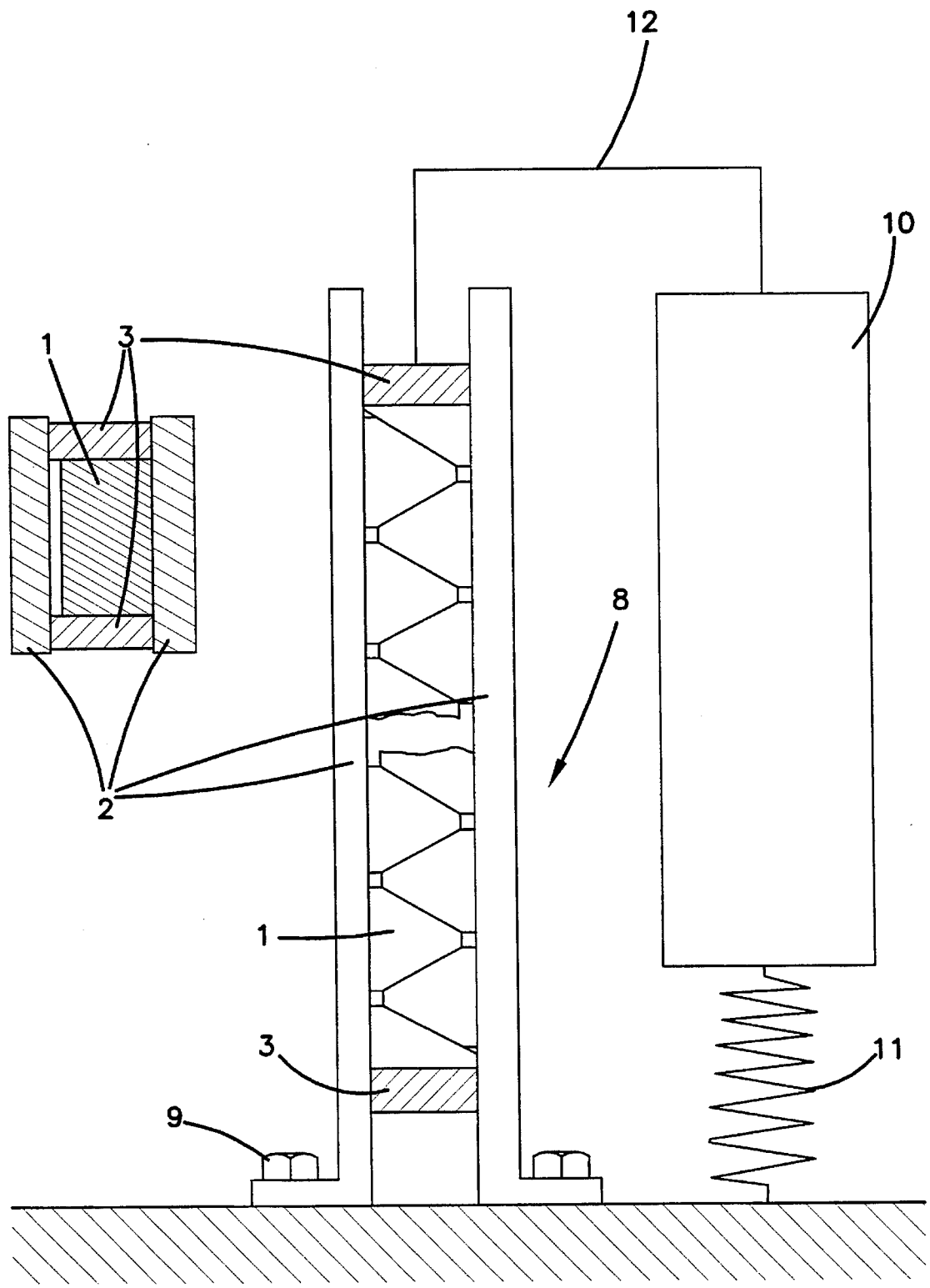
FIG. 4 is a schematic diagram of an application instance incorporating the first embodiment.

FIG. 4 is an application instance of this damper 8. The damper 8 is erected and fixed on the ground through bolts 9. A vibrator 10 is firmly connected at its lower end to the upper end of a spring 11, the lower end of the spring 11 is fixed on the ground while the upper end of the vibrator 10 is firmly connected to one end of a rigid connector 12, the other end of the rigid connector is firmly connected to the moving body 3 of the damper 8. Thus when the vibrator 10 is in vibration, it will not only be damped through the elasticity of the spring 11 but also will decrease amplitude and prevent resonance through damping of the damper 8.

In the above-mentioned embodiment, the columnar bodies of triangular cross-section are used, and apparently columnar bodies of quadrangular (except rectangular and square) and polygonal, circular, segmental, elliptical and combination of various cross-section, even spherical bodies can be used too so long as their arrangement meet the demand of the above-mentioned arrangement, namely the adjacent columnar bodies or spherical bodies are arranged staggeringly in upper and lower rows and are fitted in a locating structure, and each has a force receiving surface in opposite direction and in contact respectively with the locating structure, and moreover each has a contacting surface between adjacent columnar bodies or spherical bodies capable of being in contact successively. The columnar bodies or spherical bodies in such an arrangement are referred to as chain pieces which can also achieve an effect of resistance boosting. The present invention will be more deeply comprehended along with the following description. However, for sake of convenience, only triangle pieces are taken as instance in the following description.

Referring to FIG. 5 and FIG. 6 they are the structural diagrams of the second embodiment of the present invention. In order for the locating between adjacent triangles to be more reliable, on the basis of said structure and arrangement of the first-embodiment, a chain plate 6 can also be rotatably fitted by means of two axial pins 7 being fixed respectively on two opposite end surfaces of two adjacent triangles, and by means of several chain plates 6 joined successively to the triangles on both sides all the triangles are joined into one integer.

Figure 7:
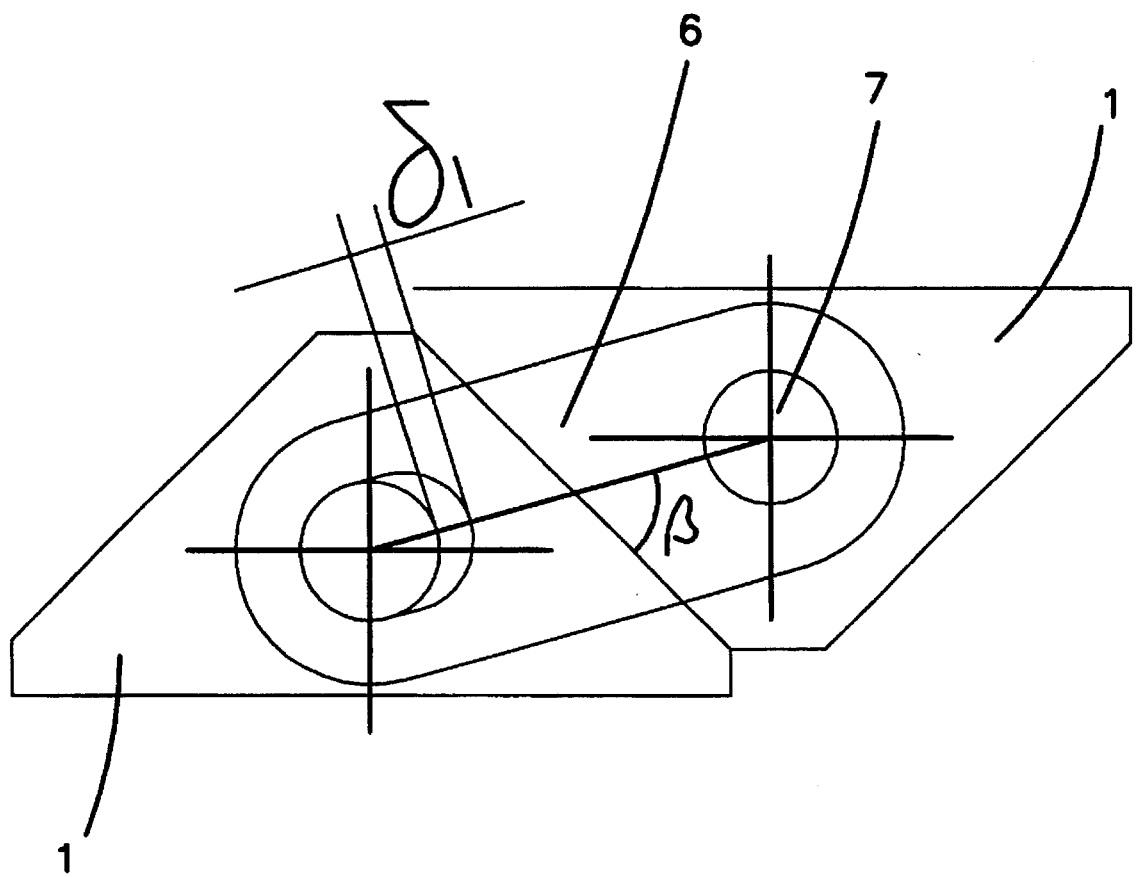
FIG. 7 is a structural diagram of joining of adjacent chain pieces; diagram of the third embodiment of the present invention.

The structure in detail of the chain plate 6 and its actual joining mode with the pin 7 on the triangle are shown in FIG. 7: There is one hole each on both ends of the chain plate 6, one of the holes is a round hole to fit the pin 7 so as to enable the chain plate 6 to rotate only around the pin 7 on the triangle 1, the other hole of the chain plate 6 is a elongated round hole, in which the pin 7 can rotate and also move along the joining line between the two holes with a displacement of $\delta_1$, an included angle $\beta$ between the joining line between the two holes and the contacting surface of two triangles 1 is less than 90°. When the booster chain is under compression at its two ends, the two adjacent triangles will slide relatively along the contacting surface and the distance between the two pins 7 will decrease accordingly. However, since the upper and lower distance of the locating structure is constant, therefore the relative sliding between the triangles is limited, provided that $\delta_1$ is large enough, the sliding between the triangles and the transfer of force will not be affected by the chain plates 6, namely the chain plates 6 being under no compression. When the booster chain is under tension at its two ends, the two adjacent triangles will move in opposite direction to increase the distance between the two pins; but since the allowable distance increment of the chain plates 6 is limited ($\delta_1$ as the maximum), therefore the adjacent triangles will be stopped by the chain plates 6 after moving a very small distance. The pulling force of the plate 6 exerted on the pin 7 has a component force in the vertical direction, under the action of this force, the two adjacent triangles will close up relatively to let the contacting surface originally in contact remain in contact, while the force receiving surface originally in contact with the two sides of the locating structure will be separated at one side or both sides, so as to decrease the friction between the booster chain and the locating structure to a minimum, even negligible. The working principle of the second embodiment is the same as that of the first embodiment, but there are still other functions which will be described in conjunction with the following embodiments. In addition, the structure provided by the present embodiment is applicable to the damper 8 shown in FIG. 4.

Figure 8:
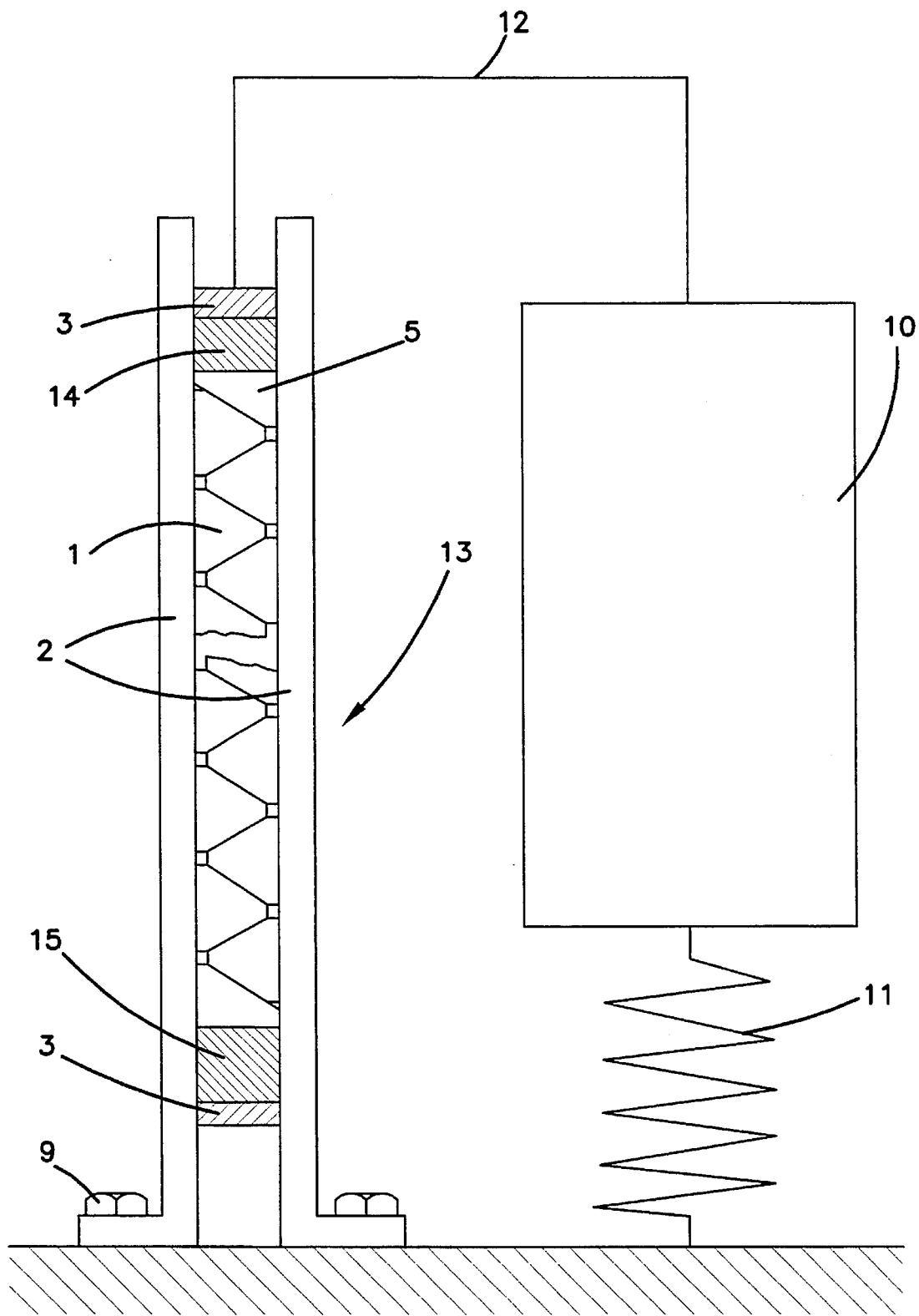
FIG. 8 is a schematic structural diagram of the third embodiment of the present invention.

Referring to FIG. 8, it is the third embodiment of the present invention and its application instance. A damper 13 here is formed on the basis of the damper 8 of the first embodiment plus two mass pieces 14 and 15, the mass piece 14 is located between the upper triangle 5 and the moving body 3, the mass piece 15 is located between the lower triangle 4 and the moving body 3, the mass of the mass piece 14 is less than the mass of the mass piece 15. Owing to the addition of the mass pieces, the movement resistance toward the mass pieces will be further boosted, and the heavier the mass pieces the more will be the boosting resistance. When the damper 13 of such a structure is arranged as shown in FIG. 8, the downward damping will be larger than the upward damping. The magnitude of damping is also related to the acceleration of the moving body 3, the larger the acceleration the larger the damping force will be. This structure enables the use of fewer triangles to achieve larger damping so as to make the structure more compact. It should be pointed out here that regardless of being at the upper end or lower end, the use of only one mass piece 14 or 15 is also feasible, thus the damping toward the mass piece will be further boosted, while the damping away from the mass piece will not be further boosted. Besides, it should be further pointed out that said functions as mentioned in the third embodiment can also be achieved by fitting a mass piece between the two ends or one end of said triangles carrying chain plates 6 and the moving body 3 in the second embodiment, and their working principle is also the same. Such a structure constitutes the fourth embodiment (not shown) of the present invention. Further, a slight modification on the basis of said structure in the second embodiment, namely to join one triangle 4 or 5 at the outmost end with the moving body 3 through chain plates 6, will constitute a structure of the fifth embodiment (not shown) of the present invention.

Figure 9:
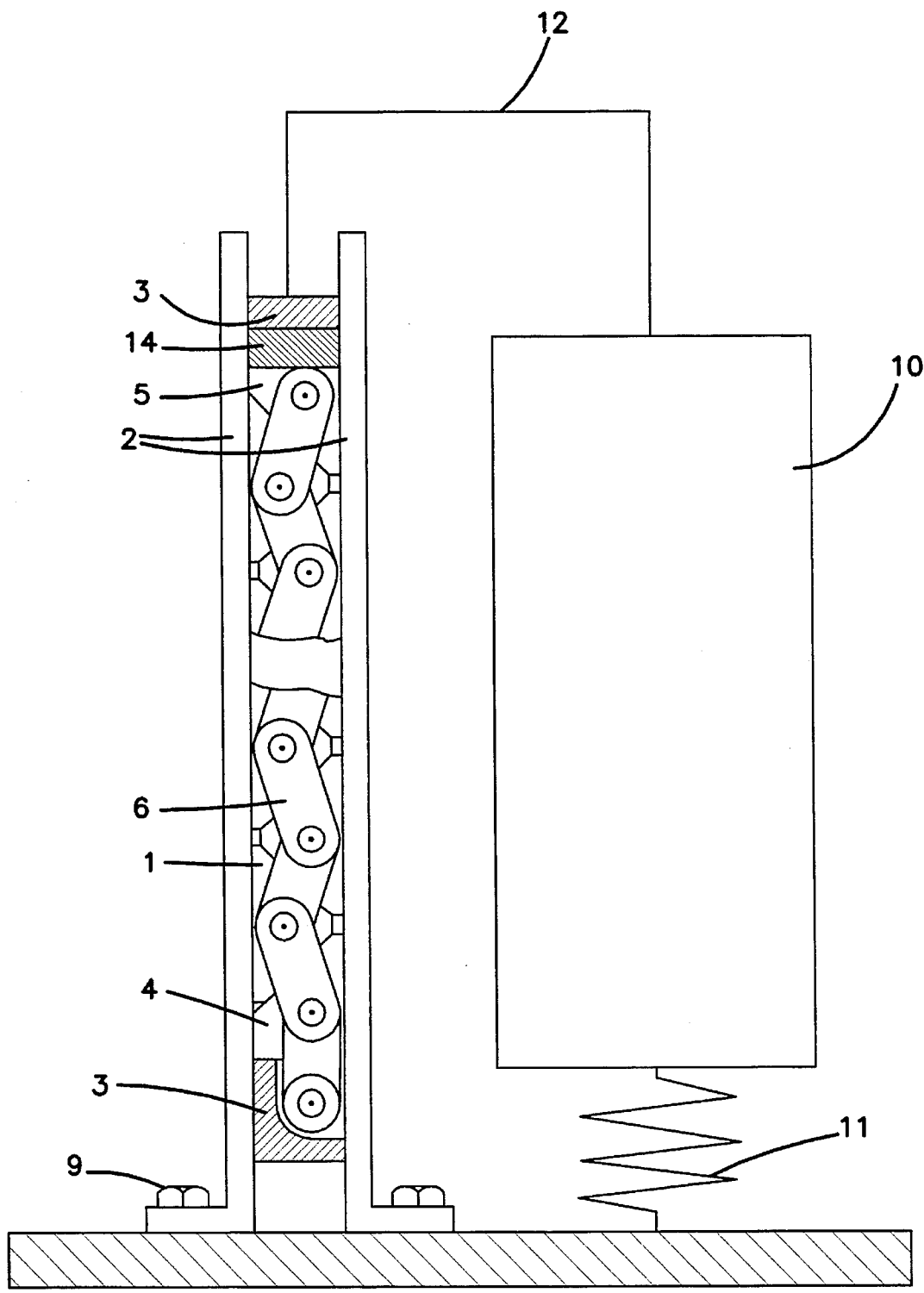
FIG. 9 is a schematic structural diagram of the sixth embodiment of the present invention.

Referring to FIG. 9 wherein a further modification is made on the basis of said structure in the fifth embodiment, namely at one end without the joining of the chain plates 6 with the moving body 3 (the upper end in FIG. 9), a mass piece 14 is fitted between one triangle 5 at the outmost end and the moving body 3, with a slight clearance between the mass piece 14 and the moving body 3. Such a structure is the sixth embodiment of the present invention.

The working principle of the sixth embodiment and the fifth embodiment is the same. Namely, when the moving body 3 joining with chain plates moves downward, the lower end of the moving body will pull through the chain plates 6 the triangle 4, and then through the triangle 4 pull the other triangles 1. According to the above-mentioned action of the chain plates 6, it is clear that such action can make the force receiving surface of every triangle separate from or not tightly press the fixed body 2, thereby to decrease the frictional resistance between every triangle and the fixed body to a minimum or negligible, and to make the downward movement of said moving body 3 and the triangles free of damping. Said moving body 3, during moving upward, will provide pressure to the triangle 4 and then successively transfer upward to other triangles 1. Owing to the mass of the triangles proper and acceleration (the fifth embodiment) or together with inertia exerted on the mass piece 14 (the sixth embodiment) the upward movement of the moving body 3 and triangles 1 is obstructed thereby to cause the force receiving surface C of all triangles 1 to move respectively to their corresponding side and to tightly press the fixed body 2 to produce friction as a damping action. Therefore the structure of these two embodiments can make the movement of the moving body 3 (including triangles 1) be damped in one direction to, and in the other direction the movement will not be damped (namely one-way damping). The action played by the mass piece 14 fitted in the sixth embodiment is the same as the action of the mass piece in the third embodiment.

Referring to FIG. 10 and FIG. 11, it is the seventh embodiment of the present invention. It has a compression spring 16 added on the basis of the fifth embodiment, the compression spring 16 is located at one end (namely the right end of FIG. 10) without the joining of chain plates between triangles and the moving body, one end of the spring 16 is connected to the triangle 5 and the other end is connected to the moving body 3. Besides, the triangle 4 of the other end can also be rigidly connected to the moving body 3 (shown in FIG. 9) not through the chain plates 6, but through a chain plate 17 in "U" shape, the two ends of said chain plate 17 are connected to the ends of the same pin 7 and its folded edges are fitted over the moving body from the outside.

The working principle of the seventh embodiment is: When a rightward push is exerted on the moving body 3, the right end of the booster chain is always under the action of the elasticity p; according to calculation and experimental measurement, the frictional resistance produced by the booster chain at this time is equal to $K^n P$ (K is a coefficient with relation to friction factor $\mu$ and the included angle $\alpha_1$ and $\alpha_2$ (See FIG. 3) between the two contacting surfaces A, B of the triangle and the middle perpendicular, but always K>1, n is the number of chain pieces (referring to triangle here); therefore with the change of $\mu$, $\alpha$ and n, the frictional resistance can be thousands upon thousands times of the elasticity P and thus the resistance is distinctly boosted. If the push is not over $K^n P$, then the booster chain (including the moving body 3) will not produce any rightward movement, namely the rightward movement is "locked". When a leftward push is exerted on the moving body 3, if the maximum static friction total value between the fixed body 2 and the force receiving surfaces of the booster chain is larger than the elasticity P, the booster chain will not produce a leftward movement, and the spring 16 will be compressed to make the moving body 3 produce a leftward displacement relative to the booster chain. Since the left end of the moving body 3 and the left end of the booster chain is joined by the chain plates 6 (or the folded chain plate 17), therefore when the relative displacement increases to a certain value, the triangle 4 will be pulled leftward with its force receiving surface separated from the fixed body 2; with the further compression of the spring 16, the pulled triangles will also increase more and more, and the maximum static friction value between the booster chain and fixed body 2 will then drop. When said value drops to slightly lower than the elasticity P, the booster chain will then start to move leftward. In this way, the resistance encountered by the moving body in moving leftward is equal to the elasticity P (the effect of acceleration is not considered and the elasticity is deemed as unchanged after the compression of the spring).

Since the resistance boosting coefficient $K^n$ may be of a very large value, hence even a very small elasticity can insure a rightward resistance large enough. When the elasticity is far less than the rightward push, it may be negligible, the leftward movement will be deemed as free. Referring to FIG. 12, it is the eighth embodiment of the present invention. It is a modification on the basis of the seventh embodiment, namely the force receiving surface at one end of the columnar body near to the compression 16 is made to decrease gradually, the columnar bodies here actually become bodies in pentagonal shape, thus the distance between the two pieces is also gradually shortened. Such kind of structure can make the compressive stress exerted on the force receiving surface of all columnar bodies as uniform as possible and shorten the length of the whole booster chain. Because the chain piece nearer to the spring end usually experiences the smaller compressive stress a nonuniform compressive stress will cause damage to mechanical equipment. The present arrangement will reduce the force receiving surfaces and increase the compressive stress to make stress on each force receiving surface more uniform.

Referring to FIG. 13, the structure shown in FIG. 13 can be used when the distance between the fixed bodies 2 for disposing chain pieces is wider. It is an improvement made on the basis of the eighth embodiment and is the ninth embodiment of the present invention. Here the triangles 1 in upper and lower rows are not in direct contact and a transition columnar body is added in between all triangles 1. The transition columnar bodies 18 shown in FIG. 13 are sexangular in cross-section. If the columnar bodies are not triangles 1 but of other shape, then the transition columnar bodies can be columnar bodies of other corresponding shape, if only they can maintain a surface contact with adjacent columnar bodies. The transition columnar bodies are connected to adjacent columnar bodies through chain plates 6. The adoption of such a structure can also make the compressive stress exerted on every triangle more uniform and shorten the whole booster chain.

As shown in FIG. 14, an elasticity boosting member in "L" shape 19 is added to one end adjacent to the spring 16, which has a long side and a short side, the long side is located between the force receiving surfaces of triangles 1 and the fixed body 2 to sustain pressure and friction from them, the short side is in contact with the triangle 5 and connected with each other through the chain plates 6, so as to become the tenth embodiment of the present invention. When the moving body 3 pushes the booster chain to move rightward, the elasticity boosting member 19 in "L" shape experiences on the upper surface of the long side a rightward friction from the booster chain and on its underneath surface a leftward friction from the fixed body 2. Since the positive pressure exerted on the upper and underneath surfaces is totally equal, hence the friction factor between the upper and underneath surfaces and the contacting surfaces will determine the magnitude and direction of the total resultant friction. If the friction factor on the underneath surface is larger than the friction factor on the upper surface, then the differential value of the two friction factors multiplied by the positive pressure will be the leftward friction experienced by the elasticity boosting member in "L" shape 19, which will together with the elasticity of the spring 16 and through the short side of the elasticity boosting member in "L" shape act on the right end of the booster chain and make the experienced pressure increased. When there are enough triangles 1 in contact with the elasticity boosting member in "L" shape, and so long as the elasticity of the spring is not zero, the resistance to rightward movement of the booster chain will increase with the increase of push, and will always keep its balance with the push, namely to produce a self-lock to the rightward movement.

In order for the elasticity boosting member in "L" shape 19 to have a certain friction factor differential value, measures can be taken such as using different materials for the upper and underneath surfaces on its long side or a wedge surface for the underneath surface, etc.

Referring to FIG. 15, in order for the elasticity boosting member in "L" shape 19 to have a certain friction factor differential value, the structure shown in FIG. 15 can also be used. In said structure, the long side of the elasticity boosting member in "L" shape 19 in contact with the surface of the booster chain is in a "saw-tooth surface" form which is composed of several slant surfaces with a certain leftward slope, the number of slant surfaces is exactly the number of triangles in contact with the long side of the elasticity boosting member in "L" shape 19 in one by one correspondence with each other. The slope of the slant surfaces will make the positive pressure have a leftward component force in the horizontal direction, when this component force is just equal to the rightward horizontal friction component force acting on the slant surface by the triangles 1, the horizontal resultant force will be zero. If every slant surface is designed just to have such a result, then the horizontal resultant force experienced on one surface of the long side of the elasticity boosting member in "L" shape 19 in contact with the triangles will be zero, this will be corresponding to a friction factor between the surface and the triangles being zero, in this way the differential value of friction factors is equal to the friction factor between the long side of the elasticity boosting member in "L" shape 19 and the fixed body 2. If the slope is larger than the slope required for zero resultant force, then the differential value of friction factors will be larger than the friction factor between the long side of the elasticity boosting member in "L" shape 19 and the fixed body 2. The above-mentioned structure constitutes the eleventh embodiment of the present invention.

In addition, an elasticity boosting member in "L" shape can also be placed on each of the upper and lower force receiving surfaces of the booster chain (not shown), so as to decrease the number of columnar bodies by one half required for producing a self-lock of rightward movement. It is the twelfth embodiment of the present invention.

Figure 16:
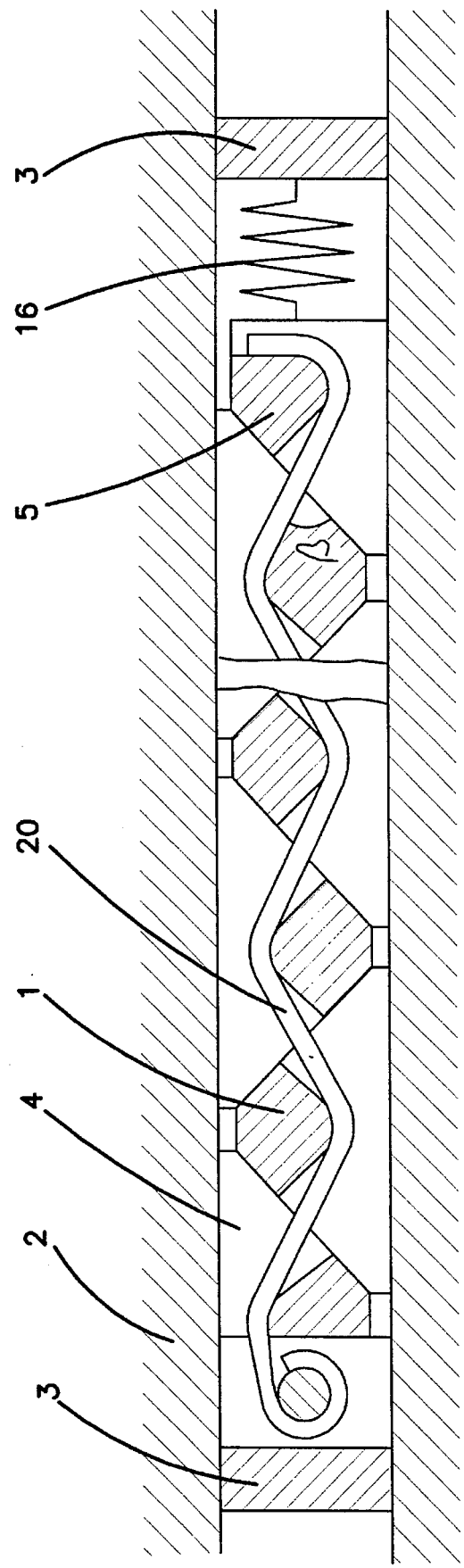
FIG. 16 is a basic structural diagram of the thirteenth embodiment of the present invention.

Referring to FIG. 16, it is a schematic structural diagram of the thirteenth embodiment of the present invention. A groove is defined in every triangle 1, 4, 5 and a corrugated leaf spring 20 is inlaid in the groove (clearance fit), there is a circular arc surface at the groove bottom protruding toward the force receiving surface to fit the inner curved surface in the bend of the corrugated leaf spring 20. One end of the corrugated leaf spring 20 is fixed on the moving body 3, and the other end is get stuck in the groove of the triangle 5. One end of the compression spring 16 is fixed on the triangle 5 and the other end is fixed on the moving body 3. When the booster chain is compressed at the left end (at this time the pressure of the spring 16 at the right end acts on the rear end of the booster chain), the triangles receiving force move to the upper and lower sides and the corrugated leaf spring 20 pushed tight by the protruding circular arc surfaces deforms, which results in the increase of the curvature at the bends. Since the elasticity of the leaf spring is very small, the positive pressure decreases on the force receiving surfaces of the triangles resulted from the elasticity can be neglected, hence there is no influence to the boosting characteristic of the whole booster chain. When the pressure at both ends of the booster chain disappears, the elasticity of the leaf spring 20 itself will make the triangles move toward (in up and down directions) the middle, thereby make the force receiving surfaces of the triangles separate from the fixed body 2, friction resistance disappear, and resistance become zero. If the elasticity is too small to produce the above-mentioned result, then at the time of pulling one end (the left end for example) of the corrugated leaf spring, the corrugated leaf spring 20 is pulled "straightened", the triangles will be pushed toward middle through the protruding circular arc surface at the groove bottom and make the force receiving surfaces separate from the fixed body 2, and resistance disappears.

If the elasticity of the leaf spring is used to make a positive pressure always exist between the force receiving surfaces of several triangles adjacent to the spring 16 and the fixed body 2, the produced friction thereby will strengthen the effect of the spring 16 and the spring 16 (not shown) may be even eliminated. The fit of these triangles with the corrugated leaf spring is slightly different to the other triangles, namely this section of the leaf spring 20 is not in contact with the protruding circular arc surfaces at the groove bottom whether the two ends of the booster chain are under pressure or under no pressure. This section of corrugated spring is actually a tension spring, the elasticity produced by this section of corrugated spring under tension acts on the two ends of these triangles and make the triangles pressed to the fixed body and produce certain pressure; when the two ends of the booster chain are under tension, the leaf spring is in contact with the circular arc surfaces at the groove bottom, and the positive pressure decreases or disappears. The above-mentioned structure constitutes the fourteenth embodiment of the present invention.

The booster chain using corrugated leaf spring is simpler in structure than booster chain using chain plates and pins and the cost is greatly reduced, it is particularly suitable or use in small mechanisms.

Based on to the conception of the present invention, there will still be many changes and modifications which are obvious to person skilled in the present technology field and examples will not be given one after another here.

The structures provided in the above-mentioned embodiments of the present invention can find applications in numerous mechanical equipment, now a description will be given with reference to specific application instances as follows.

1. Damper

The structure mentioned in the first embodiment (FIG. 1) is a simplest damper (FIG. 4), and the structures mentioned in other embodiments can also be used as damper. And it is known through analysis that if acceleration during movement of the chain pieces is considered, the friction resistance experienced by the booster chain is in proportion to acceleration.

2. Overdrive or Over-Running Clutch

Figure 18:
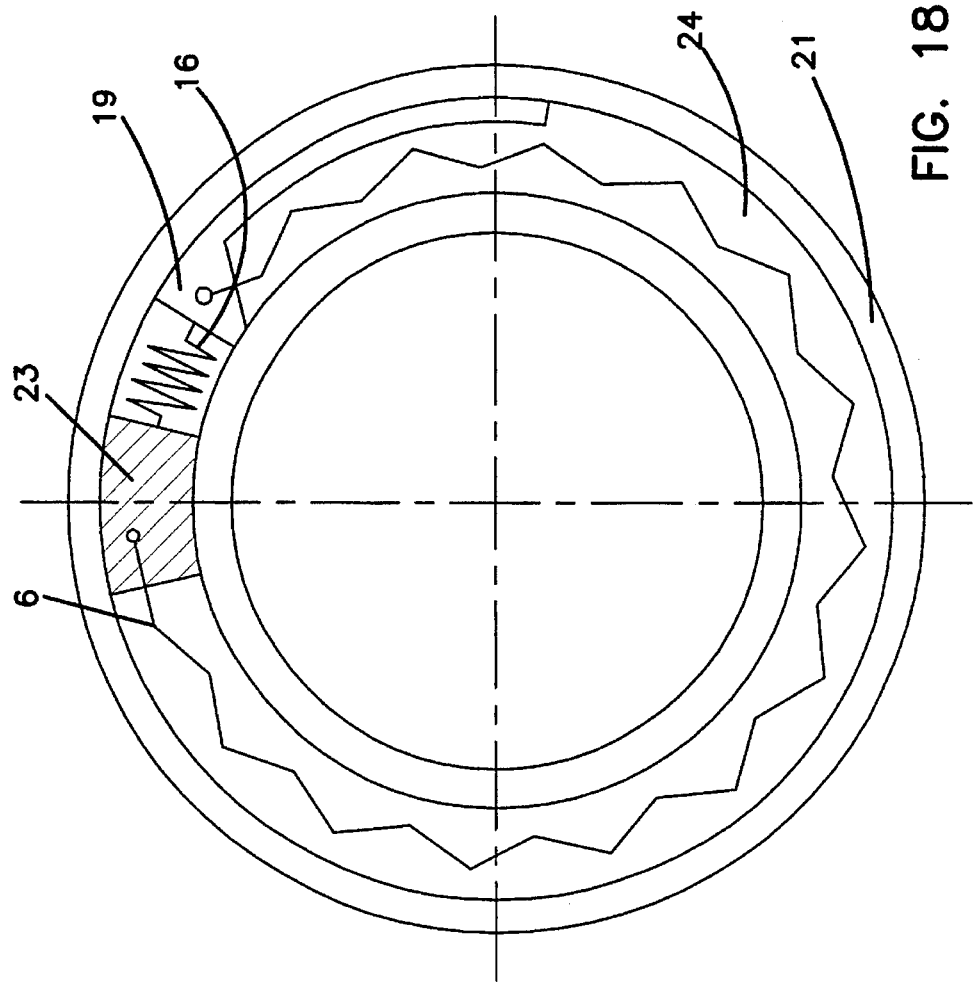
FIG. 18 is a sectional view along the line "18—18" in FIG. 17.
Figure 17:
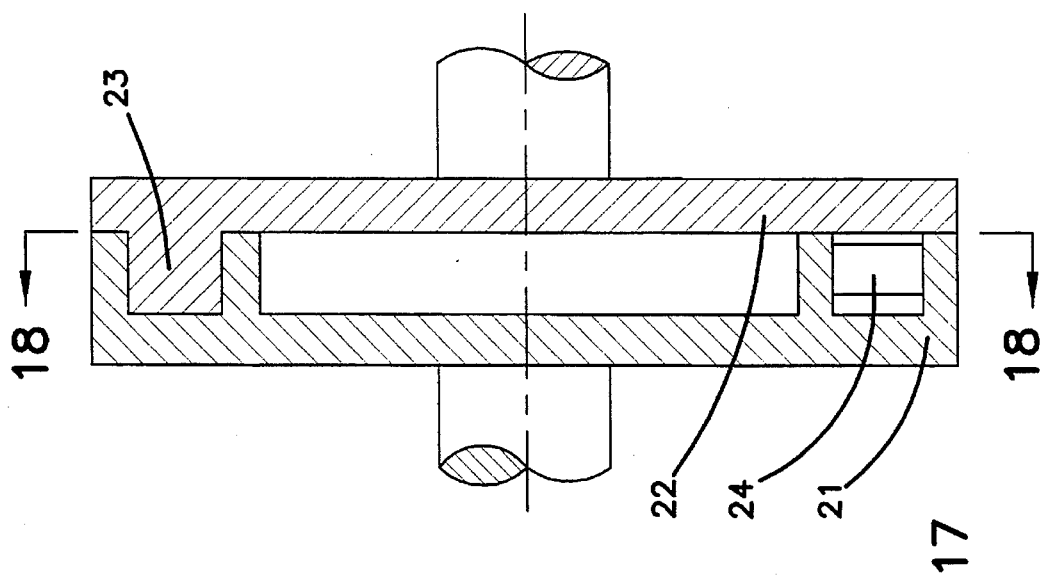
FIG. 17 is a longitudinal sectional view of an overdrive clutch utilizing the present invention.

All the structures mentioned in the seventh to the fourteenth embodiments can be used in overdrive clutch, but the booster chain in linear arrangement must be changed to peripheral arrangement. FIG. 17 and FIG. 18 are an overdrive clutch using the structure mentioned in the tenth embodiment, a disk 21 with an annular groove defined on the periphery of its side face, a protruding tongue 23 on the side face of another disk 22 is inserted in the groove and this disk 22 is able to make peripheral motion along the groove. A chain piece set 24 is arranged in the annular groove, one end is connected with the protruding tongue 23 (corresponding to the moving body 3 in FIG. 14) through chain plates 6, the other end is connected with the short side of an elasticity boosting member in "L" shape 19. One end of a compression spring 16 is fixed on the short side of the elasticity boosting member in "L" shape 19, the other end is fixed to the protruding tongue 23. If the elasticity boosting member in "L" shape is not used, then the end face of the chain piece set 24 is to bear directly on the spring 16. The force receiving surface of every chain piece of the chain piece set 24 is facing the peripheral surface on both sides of the annular groove. Here, the annular groove of the disk 21 and the annular side face corresponding to the annular groove on the disk 22 and the protruding tongue 23 are all called locating structure.

Its working principle is: When the disk 22 (namely the protruding tongue 23 on it) is rotated clockwise (See FIG. 18), the protruding tongue will pull all chain pieces through the chain plates 6 to make every force receiving surface of chain pieces separate from contact with the two peripheral surfaces of the annular groove on the disk 21, the friction resistance being negligible at this moment, so as to make the disk 22 (through the protruding tongue 23) drive the chain piece set in idle motion and the disk 21 remains stationary. When the disk 22 is rotated counterclockwise, the protruding tongue 23 will press the one end of chain piece set without the spring; since the other end of the chain piece 24 is pressed by the spring 16 (namely there is a push), according to the above-mentioned principle of resistance boosting, every chain piece in the chain piece set can only move toward the two side peripheral surfaces of the annular groove of the disk 21, and make the force receiving surface of every chain piece press tightly against the peripheral surfaces on the two sides of the annular groove, thereby make the chain piece set be "tightly fixed" in the annular groove of the disk 21, thus, the protruding tongue 23 will drive the disk 21 to rotate counterclockwise. This is the unidirectional torque transfer function of an overdrive clutch.

Figure 19:
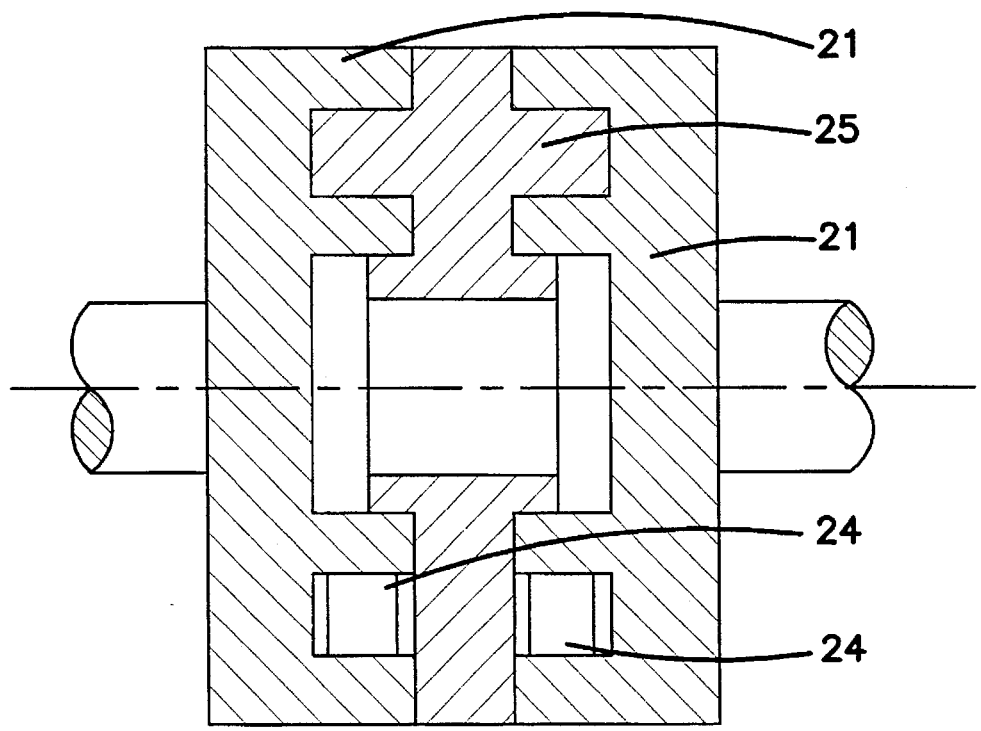
FIG. 19 is a longitudinal sectional view of another overdrive clutch utilizing the present invention.

In order for the components of the overdrive clutch to be processed and mounted more conveniently, the structure shown in FIG. 19 can also be used. This structure is actually a combination of two overdrive clutches. It can be seen in the figure that the disks 21 coupled to the two left and right shafts are identical in structure and in the annular groove of the two disks 21 is placed each a chain piece set 24, a ring 25 with a protruding tongue 23 on each of its two sides is fitted between the two disks 21. The working principle of the structure shown in FIG. 19 is similar to the working principle of the structure shown in FIG. 17.

The annular groove for placing the chain piece set 24 can also be defined on the peripheral surface of the bore (hole) or circumcircle (shaft), the protruding tongue in this case will be on the corresponding circumcircle (shaft) or bore (hole). Thus the peripheral surfaces of the chain piece set 24 arranged in ring shape will be the two surfaces receiving no force (fitting chain plates 6), and the two side surfaces in contact with the side surfaces of the annular groove are force receiving surfaces. The chain pieces of the chain piece set 24 are actually quasi-columnar bodies.

In comparison with existing roller type and wedge type over drive clutches, the overdrive clutch using booster chain has distinct improvement with respect to force receiving, the main force receiving surface of the force receiving element is turned from line contact (roller or wedge) into surface contact (triangle piece, segment piece, etc), so that the service life and reliability are greatly increased and its volume is decreased. As to structure, the booster chain overdrive clutch is simpler than the two existing types, there is a strong configurational and dimensional adaptability between the chain piece set and the annular groove, hence it is not only convenient in processing but also of lower cost than the two existing types.

3. Overload Protecter

Figure 20:
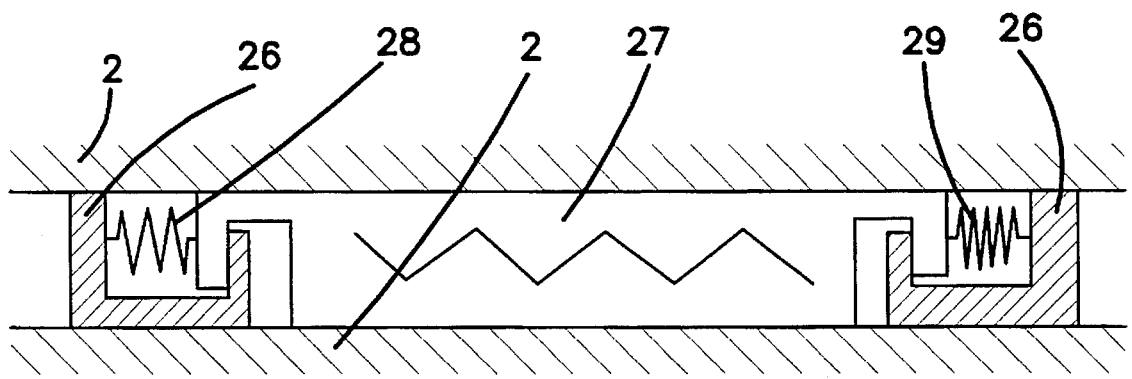
FIG. 20 is a schematic structural diagram of an overload protector utilizing the present invention.

Referring to FIG. 20, it is a linear arrangement overload protector which is an improvement made on the basis of the second embodiment. At both ends of a chain piece set there is each a spring 28 and 29 with different elasticity. At both ends of the moving body 26 and the chain piece set 27 there is each a hookshaped structure, the connection of such a structure can insure both ends of the chain piece set 27 to move in a direction far away from the center and not to move in a direction toward the center. The state shown in the figure is the chain piece set 27 in tightly pressed state.

According to analysis to the seventh embodiment, it is known that the maximum rightward movement resistance of the moving body 26 is equal to the elasticity of the compression spring 28, and the maximum leftward movement resistance is equal to the elasticity of the compression spring 29. According to the maximum load in both directions sustainable by the practical mechanism, the proper selection of elasticity value of the two springs will realize a very accurate overload protection in both directions.

The structure shown in FIG. 20 can also be used as a damper with different damping forces in two directions.

We claim:

1. A friction type resistance booster chain, comprising:
   a locating structure;
   a set of chain pieces arranged staggeringly into an upper row and a lower row and fitted in said locating structure;
   each of the chain pieces having a force receiving surface, the force receiving surfaces of two adjacent chain pieces being opposite in direction and being able to contact the locating structure, respectively;
   each of the chain pieces further having a contacting surface, the contacting surfaces of the adjacent chain pieces being contacted to each other so that the chain pieces are in contact successively, and a plurality of pins fixed on the chain pieces and a plurality of chain plates movably connected through said pins to join the chain pieces successively.

2. A friction type resistance booster chain according to claim 1, wherein said chain pieces include columnar bodies including a cross-section of triangular shape.

3. A friction type resistance booster chain according to claim 2, wherein each of said chain plates has a hole at both ends, a first hole is a round hole movably connected with a first pin on a first chain piece, a second hole is an elongated round hole connected with a second pin on a second chain piece adjacent to the first chain piece to make the second pin not only rotatable in the second hole but also able to move a certain distance along joining line between the first and second holes.

4. A friction type resistance booster chain according to claim 3, wherein a first end of said chain is connected with the locating structure by another chain plate.

5. A friction type resistance booster chain according to claim 4, further comprising a compression spring, wherein a first end of the compression spring is connected with a second end of the chain, and a second end of the compression spring is connected with the locating structure.

6. A friction type resistance booster chain according to claim 4, further comprising an elasticity boosting member in "L" shape and a compression spring, wherein said elasticity boosting member in "L" shape has a long side located between the force receiving surfaces of at least two of the chain pieces and said locating structure, and a short side connected with a second end of the chain, one end of said compression spring is fixedly connected with the short side of the elasticity boosting member in "L" shape and the other end of said compression spring is fixedly connected with the locating structure.

7. A friction type resistance booster chain according to claim 6, wherein on the long side of said elasticity boosting member in "L" shape there are at least two slant surfaces in contact respectively with the corresponding force receiving surface of the chain pieces and with a slope in a direction away from the compression spring.

8. A friction type resistance booster chain according to claim 5, wherein said force receiving surface of each chain piece adjacent to said compression spring decreases one by one.

9. A friction type resistance booster chain according to claim 1, wherein said chain pieces include quasi-columnar bodies with various cross-sections.

10. A friction type resistance booster chain, comprising:
    a locating structure;
    a first set of chain pieces arranged successively into an upper row and fitted in the locating structure, and a second set of chain pieces arranged successively into a lower row and fitted in the locating structure;
    each of the chain pieces having a force receiving surface, the force receiving surfaces of the upper row and lower row being opposite in direction and being able to contact the locating structure, respectively;
    each of the chain pieces further having a contacting surface;
    a plurality of transition chain pieces fitted between the chain pieces, wherein each of the transition chain pieces contacts simultaneously with the contacting surfaces of four adjacent chain pieces;
    a plurality of pins fixed on the chain pieces; and
    a plurality of chain plates movably connected through said pins to join the transition chain piece and the four adjacent chain pieces.

11. A friction type resistance booster chain according to claim 10, wherein each of the chain plates has a hole at both ends, a first hole is a round hole movably connected with a first pin on one of the four adjacent chain pieces, a second hole is an elongated round hole connected with a second pin on the corresponding transition chain piece to make the second pin not only rotatable in the second hole but also able to move a certain distance along a joining line between the first and second holes.

* * * * *